UNITED STATES PATENT OFFICE.

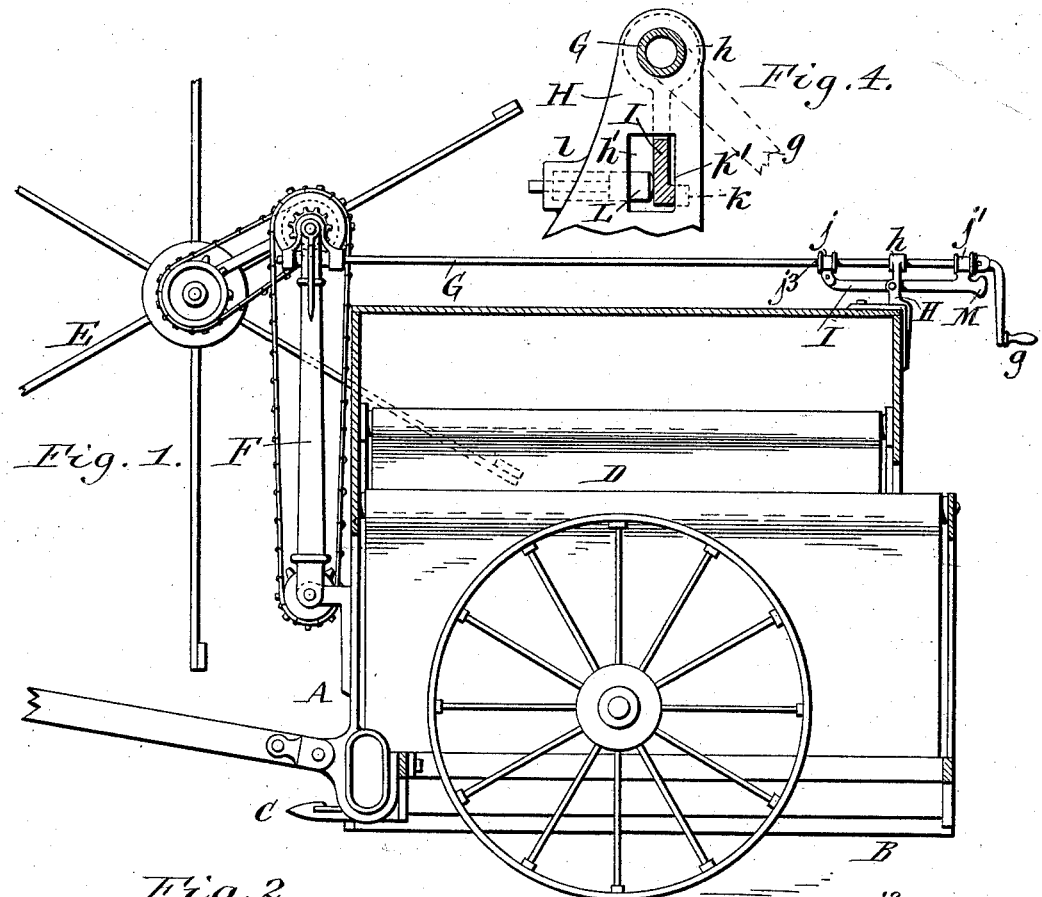

GEORGE A. FARRALL, OF BATAVIA, NEW YORK, ASSIGNOR TO THE JOHNSTON HARVESTER COMPANY, OF SAME PLACE.

GRAIN-HARVESTER.

SPECIFICATION forming part of Letters Patent No. 591,096, dated October 5, 1897.

Application filed March 12, 1897. Serial No. 627,203. (No model.)

*To all whom it may concern:*

Be it known that I, GEORGE A. FARRALL, a citizen of the United States, residing at Batavia, in the county of Genesee and State of New York, have invented new and useful Improvements in Grain-Harvesters, of which the following is a specification.

This invention relates to grain-harvesters in which the reel is mounted on a rocking standard, so that the reel can be shifted backward or forward to suit the different kinds and conditions of grain.

The object of this invention is to improve the construction of the catch whereby the reel is held in its adjusted position, so as to enable the catch to be operated more easily and conveniently than heretofore.

In the accompanying drawings, Figure 1 is a vertical longitudinal section of a grain-harvester provided with my improvements. Fig. 2 is an elevation on an enlarged scale of the reel-adjusting catch and adjacent parts viewed from the side opposite to that shown in Fig. 1. Fig. 3 is a horizontal section in line 3 3, Fig. 2. Fig. 4 is a vertical section in line 4 4, Fig. 2.

Like letters of reference refer to like parts in the several figures.

A represents the main frame of the harvester; B, the platform; C, the cutter mechanism, arranged on the front side of the platform, and D the inclined elevator whereby the grain is carried from the platform to the elevated binder mechanism.

E represents the reel, which is arranged over the platform and cutter mechanism and whereby the grain is directed upon the platform.

F represents the rocking standard, which is pivoted at its lower end to the front portion of the main frame and which carries the reel at its upper end.

G represents the horizontal adjusting-rod whereby the standard is rocked for shifting the reel backward or forward and whereby the reel may be raised and lowered. This rod is arranged lengthwise over the elevator and is connected at its front end with the standard and reel, preferably by the means shown in Letters Patent No. 559,480, granted May 5, 1896.

The rear end of the adjusting-rod is provided with a crank or handle $g$ for operating the rod, and the rod is guided and journaled in front of said crank in an eye or bearing $h$, which is formed on a bracket H, secured to the upper rear portion of the elevator-frame.

I represents a horizontal catch-bar arranged lengthwise underneath the adjusting-rod and passing through an opening $h'$, which is formed in the bracket H, below the bearing $h$. This catch-bar is provided at its front and rear ends with eyes or collars $j\,j'$, which are hung on the rod in front and in rear of the bearing $h$, and which are capable of turning on the rod, but compelled to move lengthwise with said rod by a pin $j^3$, arranged on the rod and engaging with the front collar $j$, and the hub of the crank $g$, engaging with the rear collar, or other suitable means.

One side of the catch-bar is provided with a longitudinal row of teeth $k$, which are adapted to engage with a stop $k'$, formed by one side of the opening in the bracket, thereby holding the adjusting-rod in its adjusted position. The teeth of the catch-bar are yieldingly held in engagement with the stop of the bracket by a spring-follower L, which bears against the back of the catch-bar and which is guided in a socket $l$, formed on the bracket. The spring $l'$, which projects the follower, is arranged in the socket and bears with its ends against a shoulder on the follower and the bottom of the socket.

M represents a thumb-piece which is formed on the rear end of the catch-bar, adjacent to the crank of the adjusting-rod, and whereby the catch-bar is turned for disengaging its teeth from the stop of the bracket.

When it is desired to rock the reel-standard backward or forward, the crank of the adjusting-rod is grasped by one hand and the catch-bar is turned by one of the fingers of the hand which holds the crank until its teeth are disengaged from the stop on the bracket. The adjusting-rod is now free to be shifted lengthwise in its bearing $h$, together with the catch-bar, until the standard has been tilted to the desired position, after which the catch-bar is released and the latter is turned by the spring-follower, so as to engage the teeth adjacent to the bracket with the stop on the latter, thereby rigidly holding the adjusting-rod and reel-standard in place. When it is desired to raise or lower the reel, the adjusting-shaft is turned by means of the crank without disturbing the catch-bar.

The lateral pressure which is exerted by the adjusting-rod owing to the weight of the reel is taken up by the bearing of the bracket, so that this pressure does not interfere with the releasing of the catch.

I claim as my invention—

1. The combination with the movable reel-standard and its adjusting-rod capable of longitudinal and rotary movement, of a catch-bar hung on said rod and provided with locking-teeth on its side, and a stop with which said catch-bar is interlocked by a rocking movement of the bar on said rod, substantially as set forth.

2. The combination with the movable reel-standard and its adjusting-rod, of a bearing in which the rear portion of said rod is supported and in which said rod can turn and also move lengthwise, a catch-bar hung on said rod and provided with teeth on its side, and a stop with which said catch-bar is engaged by a rocking movement of the catch-bar on said rod, substantially as set forth.

3. The combination with the movable reel-standard and its adjusting-rod capable of longitudinal and rotary movement, of a catch-bar hung on said rod and provided with locking-teeth on its side, a stop with which said catch-bar is interlocked by a rocking movement of the bar on said rod, and a spring which tends to hold said bar in engagement with said stop, substantially as set forth.

4. The combination with the movable reel-standard and its adjusting-rod capable of longitudinal and rotary movement, of a catch-bar hung on said rod and provided with locking-teeth on one side, a bracket provided with a bearing in which said rod is arranged, and an opening in which the catch-bar is arranged, a stop which is arranged on the bracket on one side of the catch-bar and with which the catch-bar is interlocked by a rocking movement of the bar on said rod, and a spring arranged on the bracket on the opposite side of the catch-bar and adapted to hold the bar yieldingly in engagement with said stop, substantially as set forth.

Witness my hand this 18th day of February, 1897.

GEORGE A. FARRALL.

Witnesses:
GEORGE O. VOLZ,
JOSIAH T. WHITCOMB.